US 7,057,768 B2

(12) United States Patent
Zaklika et al.

(10) Patent No.: US 7,057,768 B2
(45) Date of Patent: Jun. 6, 2006

(54) AUTOMATIC COLOR BALANCE

(75) Inventors: Kryzstof Antoni Zaklika, Saint Paul, MN (US); Mikhail Evgen'evich Tatarnikov, St. Petersburg (RU); Vassily Borisovich Makulov, St. Petersburg (RU)

(73) Assignee: Corel Corporation, Ottawa (CA)

( * ) Notice: Subject to any disclaimer, the term of this patent is extended or adjusted under 35 U.S.C. 154(b) by 902 days.

(21) Appl. No.: 09/897,768

(22) Filed: Jul. 2, 2001

(65) Prior Publication Data
US 2003/0002059 A1    Jan. 2, 2003

(51) Int. Cl.
G06F 15/00    (2006.01)
B41J 1/00     (2006.01)
G03F 3/08     (2006.01)
G06K 9/00     (2006.01)

(52) U.S. Cl. .................. 358/1.9; 358/522; 358/518; 382/162; 382/167; 382/168

(58) Field of Classification Search ............. 358/1.9, 358/500, 501, 504, 509, 516, 518, 520, 522, 358/523, 519; 382/167, 273, 274, 162, 168; 348/224.1; 345/87
See application file for complete search history.

(56) References Cited

U.S. PATENT DOCUMENTS

| 2,571,697 | A | | 10/1951 | Evans ......................... 95/2 |
| 4,339,517 | A | | 7/1982 | Akimoto ..................... 430/30 |
| 4,685,071 | A | | 8/1987 | Lee .............................. 364/526 |
| 4,729,016 | A | | 3/1988 | Alkofer ....................... 358/80 |
| 4,984,071 | A | | 1/1991 | Yonezawa ................... 358/80 |
| 5,062,058 | A | | 10/1991 | Morikawa ................... 364/521 |
| 5,117,293 | A | | 5/1992 | Asada et al. ................ 358/298 |
| 5,233,413 | A | | 8/1993 | Fuchsberger ................ 358/80 |
| 5,323,241 | A | | 6/1994 | Yonezawa ................... 358/298 |
| 5,357,352 | A | | 10/1994 | Eschbach ..................... 358/518 |
| 5,371,615 | A | | 12/1994 | Eschbach ..................... 358/515 |
| 5,420,704 | A | | 5/1995 | Winkelman .................. 358/520 |
| 5,487,020 | A | | 1/1996 | Long ........................... 364/571.01 |
| 5,495,428 | A | | 2/1996 | Schwartz ..................... 364/526 |
| 5,581,370 | A | * | 12/1996 | Fuss et al. .................. 358/447 |
| 5,694,484 | A | | 12/1997 | Cottrell et al. ............. 382/167 |
| 5,812,286 | A | * | 9/1998 | Lin ............................... 358/519 |
| 5,825,916 | A | | 10/1998 | Denber ........................ 382/162 |
| 5,874,988 | A | * | 2/1999 | Gu ............................... 348/97 |

(Continued)

OTHER PUBLICATIONS

Usami, A. "Signal Processing by the Input Interface to a Digital Color Laser Copier," *SID 90 Digest* 1990; 498-500.

(Continued)

Primary Examiner—Kimberly Williams
Assistant Examiner—Charlotte M. Baker
(74) Attorney, Agent, or Firm—Hansley Kim & Edgington, LLC

(57) ABSTRACT

A method corrects a color image by avenging at least two color channels in regions near the minimum of histograms of the at least two color channels; selecting the smallest of the avenge color values as a black point; averaging at least two color channels in regions near the maximum of the histograms of the at least two color channels and selecting the largest of the avenge color values as the white point; and correcting the at least two color channels by adjusting the smallest and the largest color averages to respectively match the valves of the black point and the white point to form corrected image data. A preferred method limits the adjustment to a predetermined amount of clipping of the at least two color channels.

29 Claims, 3 Drawing Sheets

U.S. PATENT DOCUMENTS

| | | | |
|---|---|---|---|
| 5,926,291 A | | 7/1999 | Haraguchi et al. ........... 358/518 |
| 6,038,340 A | * | 3/2000 | Ancin et al. ................. 382/167 |
| 6,097,836 A | | 8/2000 | Inoue .......................... 382/165 |
| 6,104,830 A | | 8/2000 | Schistad ...................... 382/167 |
| 6,118,455 A | * | 9/2000 | Hidaka et al. ............... 345/589 |
| 6,151,410 A | | 11/2000 | Kuwata et al. .............. 382/167 |
| 6,160,579 A | * | 12/2000 | Shiraiwa et al. .......... 348/224.1 |
| 6,204,940 B1 | * | 3/2001 | Lin et al. ..................... 358/527 |
| 6,631,209 B1 | * | 10/2003 | Kanamori .................... 382/169 |
| 6,791,711 B1 | * | 9/2004 | Uekusa et al. ................ 358/1.9 |
| 2002/0063666 A1 | * | 5/2002 | Kang et al. .................... 345/87 |

OTHER PUBLICATIONS

Forsyth, D. A. "A Novel Algorithm for Color Constancy," *Int'l Journal of Computer Vision*, 5:1, 5-36 (1990).

Finalayson, G., et al. "A Theory of Selection for Gamut Mapping Colour Constancy," *Proc. IEEE Conf. Comput. Vision Pat. Recognition* 0-8186-8497-Jun. 1998; 60-65.

Barnard, K., et al. "Investigations into Multi-Scale Retinex," *Color Imaging in Multimedia '98* Mar. 1998; 9-17.

* cited by examiner

AUTOMATIC COLOR BALANCE

BACKGROUND OF HE INVENTION

1. Field of the Invention

The present invention relates to the field of imaging, the field of computer assisted imaging, the field of digital imaging, and the field of automatically controlled enhancement of specific attributes of digital imaging data such as contrast.

2. Background of the Invention

The proliferation of digital imaging means such as photography, scanning, copying, printing and digital cameras has resulted in a large volume of color imagery. Since none of the devices produce consistently perfect color, especially in the hands of unskilled amateurs, there is a need to correct the color of images. Color correction has been the object of much effort in the imaging art but there remains a need for simple correction methods that can be applied in an automated way.

One approach to correcting color is based on the idea that improper colors in the scene are the result of illumination that is not perfectly white. If the illuminant of the scene can be determined, then the colors of the scene can be corrected to their appearance under some standard reference illuminant. Many methods make the assumption that specular reflections in the image have a color corresponding to the illuminant so that the brightest pixels in the image can be used to recover the illuminant color. Examples of this approach include the following. U.S. Pat. No. 4,685,071 describes estimating the illuminant by determining the locus of intersection of lines fitted through sets of points of constant hue and varying saturation. U.S. Pat. No. 5,495,428 teaches a similar method in which the improvement involves weighting the lines according to their reliability. U.S. Pat. No. 5,825,916 involves a related fitting of lines to a smoothed chromaticity bitmap. U.S. Pat. No. 6,104,830 discloses a similar procedure in which the location of the lines is estimated by means of a Hough transform. In "Signal Processing by the Input Interface to a Digital Color Laser Copier" by A. Usami, *SID 90 Digest*, p. 498–500 (1990) the brightest non-white pixel is considered representative of the illuminant and is adjusted to a neutral color. However, these methods fail when detector saturation occurs since the brightest pixels then no longer represent the illuminant and, except for the Usami procedure, are computationally expensive.

An alternative approach to illuminant estimation is to examine the gamut of colors in an image. If certain colors are present in the image particular illuminants can be excluded. For example, since objects are usually colored by virtue of reflecting light, if a scene contains the color red then the illuminant must contain red and cannot, for instance, be blue. The gamut mapping procedure for illuminant recovery is described in "A novel algorithm for color constancy" by D. Forsyth, *Int. J. Comput. Vision*, 5, p. 5–36 (1990). A more efficient version in a chromaticity color space has been developed by G. Finlayson and S. Hordley, *Proc. IEEE Conf. Comput. Vision Patt. Recogn.*, p. 60–65 (1998). European Pat. 0 862,336 teaches the use of the method in a digital camera. These methods are computationally intensive an do not uniquely identify the illuminant with additional assumptions. Moreover, digital images can be subject to arbitrary color manipulation so that color imbalance does not necessarily result from illuminant changes.

Yet another method of color correction is based on the gray world assumption introduced by Evans in U.S. Pat. No. 2,571,697. The method relies on the idea that in a complex natural scene such as typically occurs amateur photographs the average of all the colors is gray. Thus, by adjusting the mean color of the image to gray, color correction can be achieved. However, this method fails when the scene content does not, in fact, correspond to an average gray. This happens, for instance, when an object of a single color dominates the scene or in digital images, such as business graphics, which have a simple color distribution. There have been attempts to improve the method by applying it to individual luminance ranges in the image. Examples include U.S. Pat. No. 5,233,413, U.S. Pat. No. 5,357,352 and U.S. Pat. No. 5,420,704. Another variation in U.S. Pat. No. 5,926,291 seeks to use only colors of low and high brightness and also low saturation as the basis for correction. The same gray world assumption is used in the retinex family of algorithms as discussed in "Investigations into multiscale retinex", K. Barnard and B. Funt, *Color Imaging in Multimedia '98*, p. 9–17, Derby, UK, March 1998. None of these methods are, however, fully satisfactory because of failure of the gray world assumption.

In order to improve color balancing performance some workers have taken advantage of the statistical distribution of image types submitted to the color correction system and have developed corrections tailored to certain common types of color defects. Examples include U.S. Pat. No. 4,339,517 and U.S. Pat. No. 6,097,836. However, such approaches are useless when the images to be processed do not fall into a few simple categories. Other correction methods attempt to capture the experience of imaging experts by developing rules for image correction based on examination of a very large number of images as exemplified by U.S. Pat. No. 5,694,484. In WO 97/01151 there is disclosed a color correction system that is taught color preferences through the use of neural networks. Such methods frequently fail when they encounter images not in the original training set. Moreover, the effort of developing such a method is very great because of the large number of images on which it is based and the resulting method is hard to understand and modify because of its complexity. In the case of neural networks, there is a danger of over-training, where correction of the training set improves at the expense of generality in the correction performance.

A range of empirical color correction methods also exist, which are based on statistical analysis of color histograms and sometimes also brightness histograms. Examples include U.S. Pat. No. 4,729,016, U.S. Pat. No. 4,984,071, U.S. Pat. No. 5,117,293, U.S. Pat. No. 5,323,241 and U.S. Pat. No. 6,151,410. Most of these methods place particular emphasis on the highlight and shadow regions of the histogram though some, such as U.S. Pat. No. 6,151,410, specifically exclude some of these regions on the grounds that the data are unreliable. These methods depend on the image data set used to derive the statistical analysis of the histogram and can be unsatisfactory for images of a type not in the original data set. At least some cause over-correction of the image when applied repeatedly and can result in information loss through clipping of the lowest and highest intensities in the image. These methods are, further, inherently incapable of correcting for different scene illuminants.

There are also color correction methods based on manually specifying a black or white point in the image or a color that should be considered as neutral gray. Such a capability is available as software in the "Balance to sample" feature of PhotoStyler 2.0 (Aldus Corporation, 411 First Avenue South, Seattle, Wash. 98104), in the "Curves" feature of Photoshop 5.5 (Adobe Systems Incorporated, 345 Park Avenue, San Jose, Calif. 95110–2704) and in the "Automatic" mode of the "Tint" feature in PhotoDraw 2000 (Microsoft Corporation, One Microsoft Way, Redmond, Wash. 98052-6399). Correction using manually specified highlight and shadow regions is disclosed in U.S. Pat. No. 5,062,058 and the falls within the claims of U.S. Pat. No. 5,487,020. These methods, however, require manual intervention and it can be difficult to select the optimal black and white points to achieve the desired correction. There have been attempts to automate this correction process. In 1996 Photoshop 4.0 introduced the "Auto Levels" feature that stretches the three color channel histograms to full range, by default clipping the top and bottom 0.5% of the channel values. A similar feature is available as "Auto Tonal Adjustment" in PhotoStyler 2.0. Additionally, U.S. Pat. No. 5,812,286 teaches such a method of correction. These methods have the disadvantage that part of the image information is lost through the clipping process and, further, image contrast is undesirably changed along with the correction of color. An attempt to solve this difficulty is disclosed in U.S. Pat. No. 5,371,615 wherein the RGB color triplets for each image pixel are examined to determine the blackest non-black pixel as min[max(R,G,B)] and the whitest non-white pixel as max[min(R,G,B)] ignoring exactly black and exactly white pixels. Subsequently a black point $W_{min}$ is specified as having all three color channels equal to min[max(R,G,B)] and a white point $W_{max}$ as having all three color channels equal to max[min(R,G,B)] and then each color channel value $X_{in}$ is corrected to a new value $X_{out}$ according to:

$$X_{out}=(W_{max}-W_{min})\times(X_{in}-X_{min})/(X_{max}-X_{min})+W_{min}.$$

This procedure, however, has the disadvantage that the color correction can depend on as few as two pixels in the image. This renders the method susceptible to noise and to defective pixels in digital camera detectors. At the same time the method does not retain the contrast of the image, an effect that can be especially marked when the green channel does not participate in the definition of $W_{min}$ and $W_{max}$.

SUMMARY OF THE INVENTION

It is an aspect of this invention to provide a method of color correction for digital images. A further aspect of the invention is to provide a method of removing strong color casts from images. Another aspect of the invention is to provide a means of automatically correcting color balance in images. Yet another aspect of the invention is to correct color balance in an image by a means that allows compensation for the color of the scene illuminant. Still another aspect of the invention is to provide a method of color correction that leaves image contrast substantially unchanged.

These and other aspects of the invention are achieved by averaging color channels in regions near the minimum of the histograms of the color channels and selecting the smallest of the average color values as a black point; averaging color channels in regions near the maximum of the histograms of the color channels and selecting the largest of the average color values as a white point; correcting the color channels by adjusting the aforementioned color averages to the match the values of the black point and white point, this adjustment being done optionally in a way that limits clipping of color values; optionally providing an illuminant correction; and optionally providing a method to restore image contrast after color correction.

DETAILED DESCRIPTION OF THE INVENTION

Figure 1:
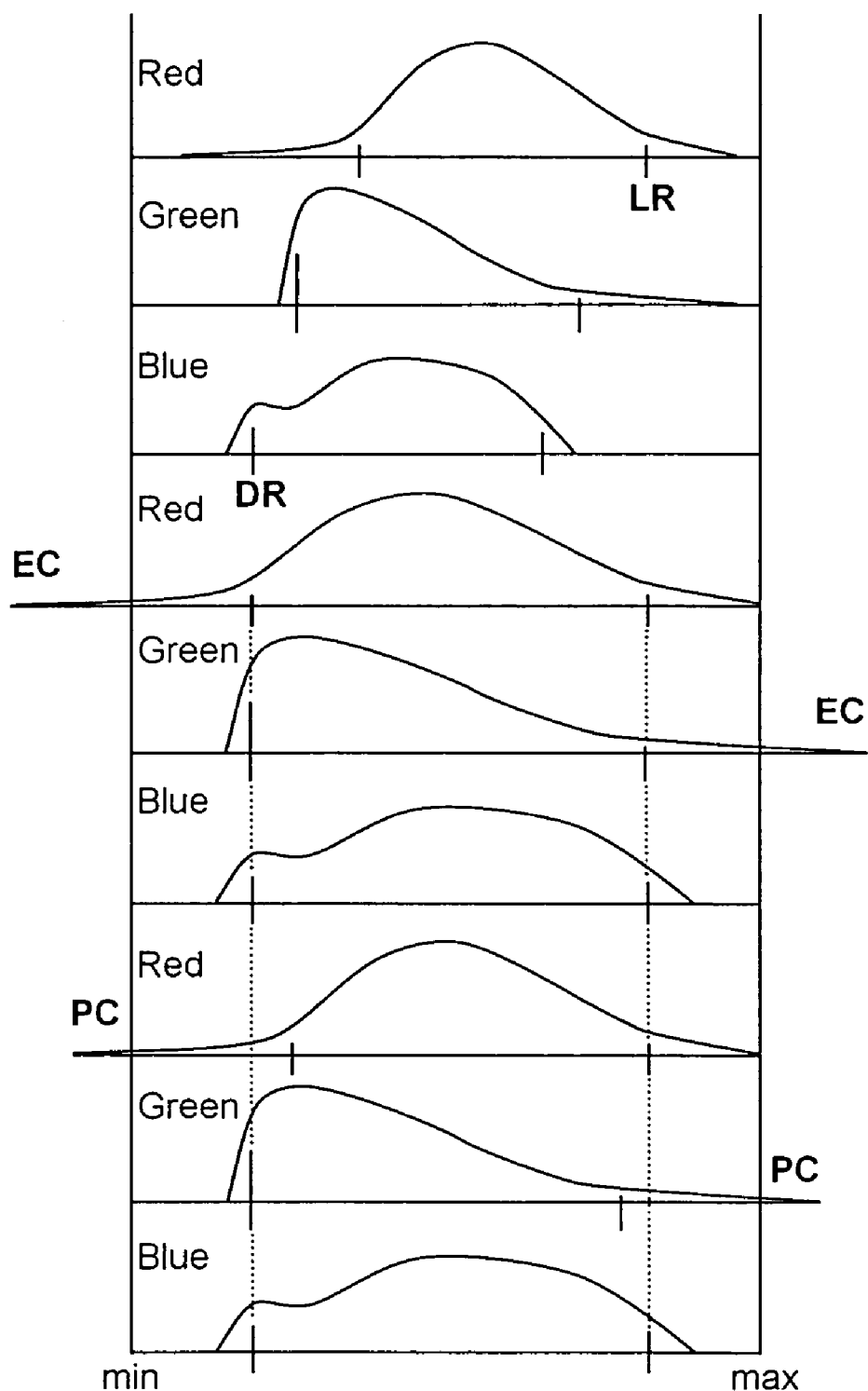
FIG. 1 shows brightness histograms with identified regions of maximum color values and minimum color values, average points, black points, white points, and color value limits.

The invention operates on digital images in which information is supplied as a grid of points or pixels. Each pixel is associated with several numbers representing color information. Typically, these are three 8- or 12-bit values representing respectively red (R), green (G) and blue (B). While the invention will be illustrated using such RGB images as examples, it will be understood that more than three or more colors can be used to represent color information, that the color space used to define color need not be restricted to RGB and that the color information is not restricted to any specific form of numeric representation. Although the invention will be described in terms of calculations using all the image pixels, it also understood that the invention may be applied to only a portion of the image pixels, either with respect to the analysis used to derive the means of correction or with respect to the regions of the image that undergo the correction, or both. Whereas the invention will be described in terms of certain illustrative embodiments it will be understood that wide variation of specific realizations of the invention is possible within its scope.

In the practice of the invention, there are four sub-component processes that may be combined, each of the sub-components of the process being novel. The first two sub-component processes relate to an initial color correction step in data format, and the second two steps effect actual implementations of the color adjustments on the data or images. The initial color correction, in general terms involves averaging at least two color channels in regions near the minimum of histograms of the at least two color channels; selecting the smallest of the average color values as a black point or dark reference point; averaging at least two color channels in regions near the maximum of the histograms of the at least two color channels and selecting the largest of the average color values as a white point or light reference point; correcting the at least two color channels by adjusting the smallest and the largest color averages to respectively match the values of the black point and the white point to form corrected image data. It is preferred to impose a clipping limit restriction on the process of matching average color values to the reference points (i.e., the black point and the white point) and the first two sub-component processes for initial color correction differ in how this may be accomplished.

The first inventive step will be referred to as the "direct color correction." The process would ordinarily be performed for each color (e.g., R, G and B), but may be performed for only two colors and provide an effect on an image. The process may comprise:

1) For each color, forming a histogram of the darkest pixels in the image data (ignoring pixels with 0, 0, 0 values, that is true black pixels). The measure of darkness is the largest of the color values at a pixel.

2) For each color, forming a histogram of the lightest pixels in the image data (ignoring pixels with 255, 255, 255 values, that is true white pixels). The measure of lightness is the smallest of the color values at a pixel.

3) For the histogram of darkest pixels for each color determining a number (that is, more than one, or at least two) of the darkest pixels and compute a dark average value for this number of pixels. It is preferred that the number be a specific fraction of the area under the histogram.

4) For the histogram of lightest pixels for each color determining a number (that is, more than one, or at least two) of the lightest pixels and compute a light average value for this number of pixels. It is preferred that the number be a specific fraction of the area under the histogram.

5) Selecting the smallest dark average from among those determined for each channel for the darkest pixels as a dark reference point.

6) Selecting the largest light average from among those determined for each channel for the lightest pixels as a light reference point.

7) Specifying a fraction of image pixels as a maximum clipping fraction for each color channel for dark colors and for light colors. This defines a dark clip limit value for each color and a light clip limit value for each color. Any color value less than the dark clip limit value may be set to the minimum possible value for the color (e.g., 0). Any color value greater than the light clip limit value may be set to the maximum possible value for the color (e.g., 255).

8) Conceptually, for each channel displacing the dark average value towards the dark reference (where one of these averages is the dark reference and does not move). The movement continues until either the average aligns with the reference or the dark clip limit value aligns with the minimum channel value, whichever comes first.

9) Conceptually, for each channel displacing the light average value towards the light reference (where one of these averages is the light reference and does not move). The movement continues until either the average aligns with the reference or the light clip limit value aligns with the maximum channel value, whichever comes first.

10) For all the values of each color that are not clipped, constructing a linear look-up table between a point defined by the original and displaced positions of the dark average and a point defined by the original and displaced positions of the light average and applying the look-up table to modify the color values in the image.

Elements of this process are diagramed in FIG. 1. The top panel shows the original histograms for red, green and blue channels. The shaded areas at each end of the histogram represent the fraction of pixels used to compute the dark and light averages. The values of these averages are marked with short solid vertical lines. The dark reference is marked DR and the light reference is marked LR. The center panel shows perfect alignment of all three dark averages with the dark reference and of all three light averages with the light reference, as indicated by the dotted lines. Under these conditions low values of the red channel would be excessively clipped (EC) to a degree greater than permitted by the specified maximum clipping fraction. Similarly high values of green channel would be excessively clipped (EC). The bottom panel shows the results of the above specified process, where the dark average or the red channel is moved only as far towards the dark reference as is consistent with the permitted amount of clipping PC. Thus, the low averages of the green and blue channels align with the dark reference but that of the red channel does not. For the red channel the dark clip limit value aligns with the minimum color value. Similarly, the light average of the green channel is moved only as far towards the light reference as is consistent with the permitted amount of clipping PC. Thus while the light averages of the red and blue channels align with the light reference, for the green channel the light clip limit aligns with the maximum color value.

The second inventive step will be referred to as the "color cast correction." The process would ordinarily be performed for each color (e.g., R, G and B), but may be performed for only two colors and provide an effect on an image. The process may comprise:

1) For each color, forming a histogram of the darkest pixels in the image data (ignoring pixels with 0, 0, 0 values, that is true black pixels). The measure of darkness is the largest of the color values at a pixel.

2) For each color, forming a histogram of the lightest pixels in the image data (ignoring pixels with 255, 255, 255 values, that is true white pixels). The measure of lightness is the smallest of the color values at a pixel.

3) For the histogram of darkest pixels for each color determining a number (that is, more than one, or at least two) of the darkest pixels and compute a dark average value for this number of pixels. It is preferred that the number be a specific fraction of the area under the histogram.

4) For the histogram of lightest pixels for each color determining a number (that is, more than one, or at least two) of the lightest pixels and compute a light average value for this number of pixels. It is preferred that the number be a specific fraction of the area under the histogram.

5) Selecting the smallest dark average from among those determined for each channel for the darkest pixels as a dark reference point.

6) Selecting the largest light average from among those determined for each channel for the lightest pixels as a light reference point.

7) Specifying a fraction of image pixels as a maximum clipping fraction for each color channel for dark colors and for light colors. This defines a dark clip limit value for each color and a light clip limit value for each color. Any color value less than the dark clip limit value may be set to the minimum possible value for the color (e.g., 0). Any color value greater than the light clip limit value may be set to the maximum possible value for the color (e.g., 255).

8) Conceptually, for each channel displacing the dark average value towards the dark reference (where one of these averages is the dark reference and does not move). The movement continues until there is perfect alignment.

9) Conceptually, for each channel displacing the light average value towards the light reference (where one of these averages is the light reference and does not move). The movement continues until there is perfect alignment.

10) Conceptually, and if required, displacing the aligned dark averages in unison to higher values until the low values of every color are clipped to an extent no greater than the maximum clipping fraction.

11) Conceptually, and if required, displacing the aligned light averages in unison to lower values until the high values of every color are clipped to an extent no greater than the maximum clipping fraction.

12) For all the values of each color that are not clipped, constructing a linear look-up table between a point defined by the original and displaced positions of the dark average and a point defined by the original and displaced positions of the light average and applying the look-up table to modify the color values in the image.

Figure 2:
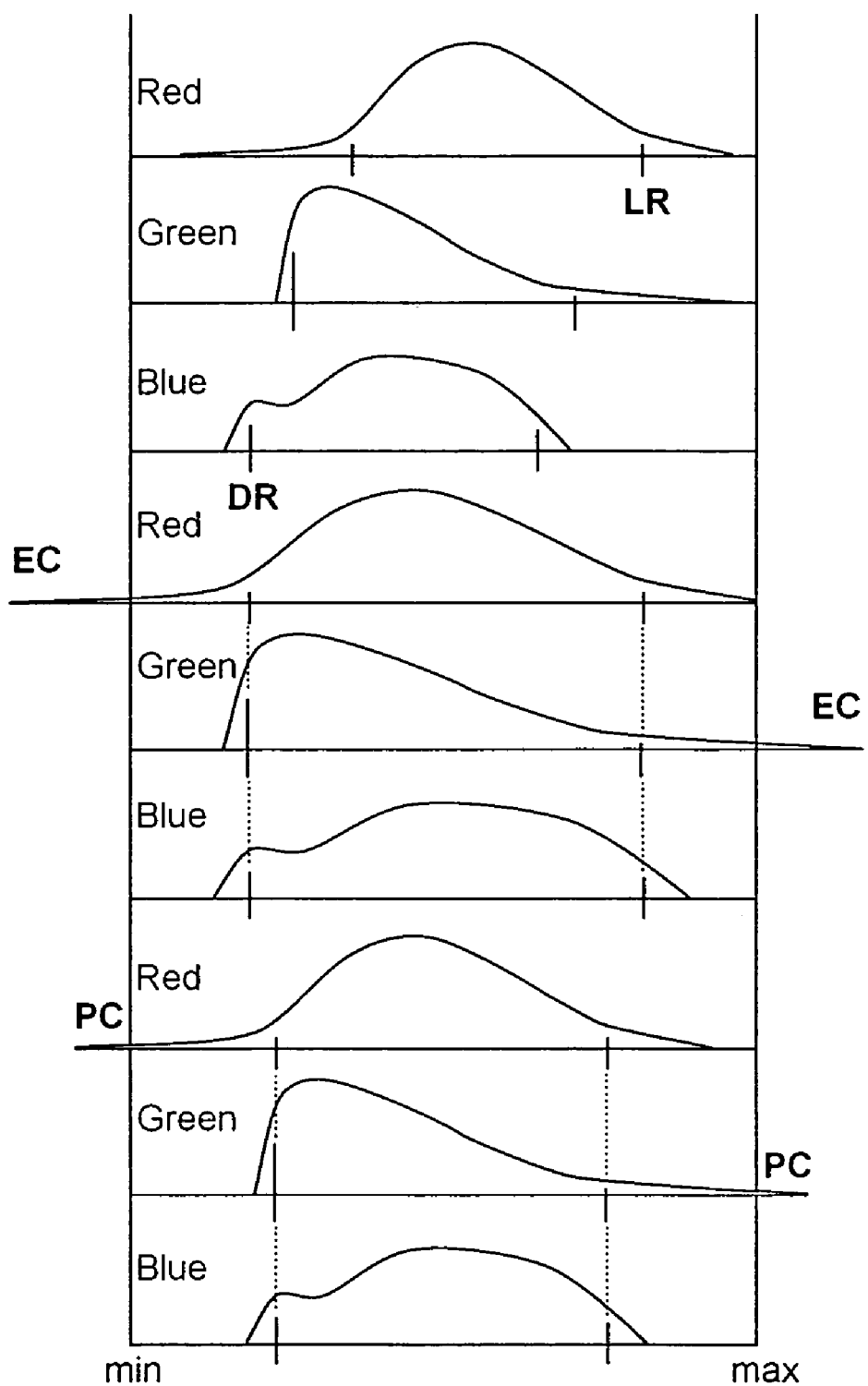
FIG. 2 shows brightness histograms with identified regions of maximum color values and minimum color values, average points, black points, white points, and color value limits.

Elements of this process are diagramed in FIG. 2. The top panel shows the original histograms for red, green and blue channels. The shaded areas at each end of the histogram represent the fraction of pixels used to compute the dark and light averages. The values of these averages are marked with short solid vertical lines. The dark reference is marked DR and the light reference is marked LR. The center panel shows perfect alignment of all three dark averages with the dark reference and of all three light averages with the light reference, as indicated by the dotted lines. Under these conditions low values of the red channel would be excessively clipped (EC) to a degree greater than permitted by the specified maximum clipping fraction. Similarly high values of green channel would be excessively clipped (EC). The bottom panel shows the results of the above specified process, where the dark averages maintain alignment but are displaced to higher values to reduce the clipping of the red channel to the permitted amount of clipping (PC). Similarly the light averages maintain alignment but are displaced to lower values until the green channel has no more than the permitted amount of clipping (PC). Thus while all the averages are aligned in the center and bottom panels, the separation between the dark and light averages or, equivalently the separation between dark and light references, is reduced in the bottom panel.

This process can be alternatively and more mathematically described as the pixels of the image being examined with regard to the RGB values at each pixel in order to define highlight and shadow regions of color. This may be done in a number of ways, for example by building histograms of color distribution in each channel. If these histograms are computed in cumulative (i.e., integral) form it is possible to define a shadow region as those colors lying below some integral threshold and highlights as those colors lying above some integral threshold. Such thresholds correspond to fractions of the total number of pixels in the image. It is also possible to use only a single channel, for instance a brightness channel, to define highlight and shadow regions. In practice a convenient way to define the shadow and highlight regions is the following. A histogram is constructed of the minimum values, min[R(i,j), G(i,j), B(i,j)], in each color triplet for every pixel with coordinates (i,j) and pixel color values belonging to a certain integral fraction measured from the high end of the histogram are defined as belonging to the highlight region. Here min[R(i,j), G(i,j), B(i,j)] means the smallest value of the three color values defining a pixel and the aforementioned fraction is termed a region fraction. Similarly, a histogram is constructed of the maximum values, max[R(i,j), G(i,j), B(i,j)], in each color triplet for every pixel and pixel color values belonging to a certain integral fraction measured from the low end of the histogram are defined as belonging to the shadow region. Here max[R(i,j), G(i,j), B(i,j)] means the largest value of the three color values defining a pixel. Though pure black pixels and pure white pixels can be included in these calculations, it is preferred to omit them since these pixels are often unreliable because of the prior processing history of the image. In the event that the histograms are empty because the image contains only black, or only white, or only black and white pixels, correction is not performed. The region fractions used to define shadows and highlights can be the same or different, though it is convenient to use the same fraction for both ranges. The region fraction can be a number greater than 0% and less than 50%, with a preferred range of 0.04% to 40% and a most preferred range of about 4%. It has been found that a range of about 4% is suitable for balancing the color of the majority of images encountered, without any user intervention, in an automatic way. Very high values near the top of the range can be used for extremely poor images with exceptionally poor color balance. For this reason, though the invention can function without user intervention for normally encountered images, it is useful to also provide the user with control of the fraction defining shadow and highlight regions. The region fraction could be set directly by the user but it has been found that a non-linear control best represents the visual effect of changing this fraction. For example, an implementation where linear steps in the control correspond to logarithmic steps in the region fraction has been found effective.

A description of the second step would be that, for all pixels whose max[R(i,j), G(i,j), B(i,j)] values lie in the shadow region, the individual color channels are averaged to produce three average colors $R_{low}$, $G_{low}$ and $B_{low}$, constituting histogram control points. The minimum of these three values, $X_{low}$, is then computed as a reference point. Similarly, for all pixels whose min[R(i,j), G(i,j), B(i,j)] values lie in the highlight region, the individual color channels are averaged to produce three average colors $R_{high}$, $G_{high}$, $B_{high}$ constituting additional histogram control points. The maximum of these three values, $X_{high}$, is then computed as a second reference point. The intent of the invention is to stretch the color histograms in such a way that the control points $R_{low}$, $G_{low}$ and $B_{low}$ coincide with the $X_{low}$ reference point and the control points $R_{high}$, $G_{high}$, $B_{high}$ coincide with $X_{high}$ reference point, though this intent may be restricted by conditions to be described later. This histogram stretching can be conveniently and efficiently achieved by construction of look-up tables that relate initial channel value to channel values after correction. The use of color averaging confers noise immunity on the algorithm.

Figure 3:
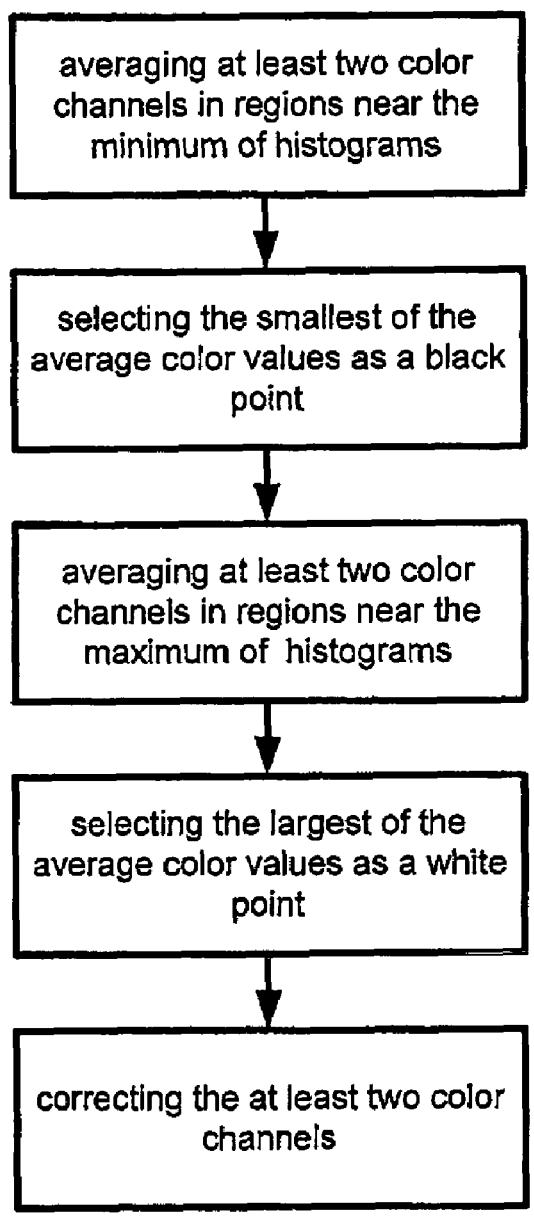
FIG. 3 is a flow chart illustrating a method according to the present technology.

FIG. 3 provides a generalized method 300 of the present technology. More particularly, shown in FIG. 3 is a method for correcting a color image comprising:

averaging at least two color channels in regions near the minimum of histograms of the at least two color channels;

selecting the smallest of the average color values as a black point;

averaging at least two color channels in regions near the maximum of the histograms of the at least two color channels;

selecting the largest of the avenge color values as a white point; and correcting the at least two color channels by adjusting the average color values to match the values of the black point and the white point to form corrected image data.

As will be discussed later in the description of specific embodiments of the invention, the alignment of histogram control points with their respective reference points is restricted by control of histogram clipping. By clipping is meant the conversion of a range of shadow or highlight input values into a single shadow or highlight output value. This results in information loss from the image and is consequently undesirable. A clipping fraction can be defined as that range of color values which are responsible for a particular fraction of the of the area under the histogram, which in turn corresponds to a particular fraction of pixels in the image. The clipping fraction is measured from the ends of the color channel histograms in a manner similar to that described for the region fraction. It is a measure of the amount of information that is lost from the image as a result of clipping. The clipping fraction can be different at the high and low ends of the histogram but it is preferred to use the same fraction at both ends. The clipping fraction can be a number from 0% to less than the region fraction, with a preferred range of from about 0.0001% to about 10%, and a most preferred range of from about 0.01% to about 5%. Additionally, it is especially preferred to make the clipping fraction dependent on the region fraction such that the clipping fraction is from about 0.02 to about 0.2 times the region fraction. Most especially preferred is a clipping fraction of about 0.2 times the region fraction. For the preferred region fraction of about 5% the preferred clipping fraction is thus about 0.1%.

First Embodiment

This embodiment is suitable for processing the majority of normal images that required color balancing, especially when it is desired to perform the correction automatically without user intervention. In the shadow region each of the control points $R_{low}$, $G_{low}$, $B_{low}$ that lies above $X_{low}$ is moved towards the reference point $X_{low}$, subject to the condition that the clipping fraction is not exceeded. Thus, if a particular channel does not exceed the predetermined clipping fraction its control point is aligned with $X_{low}$. Otherwise, the channel value of the histogram that corresponds to the clipping fraction becomes aligned with $X_{low}$. The judgement of clipping is done channel by channel, without regard to the amount of clipping in other color channels. Similarly, in the highlight region each of the control points $R_{high}$, $G_{high}$, $B_{high}$ that lies below $X_{high}$ is moved towards the reference point $X_{high}$, subject to the condition that the clipping fraction is not exceeded. Thus, if a particular channel does not exceed the predetermined clipping fraction its control point is aligned with $X_{high}$. Otherwise, the channel value of the histogram that corresponds to the clipping fraction becomes aligned with $X_{high}$. Again the judgement of clipping is done channel by channel, without regard to the amount of clipping in other color channels. The old and new positions of the control points are used to establish three linear look-up tables for correcting the color balance.

Second Embodiment

This embodiment, referred to as the color cast correction, is suitable for processing the majority of normal images that require color balancing and in addition is useful for images that exhibit strong color errors in the form of a distinct color cast. It can also be applied to the automatic correction of images without user intervention. The procedure will be described in two steps for clarity but, as will be appreciated by those skilled in the art, it can also be accomplished in a single step. In step 1, for the shadow region each of the control points $R_{low}$, $G_{low}$, $B_{low}$ is moved into exact alignment with the reference point $X_{low}$. (Note that one color control point is already coincident with $X_{low}$ as it was used to determine $X_{low}$). Similarly, in the highlight region each of the control points $R_{high}$, $G_{high}$, $B_{high}$ is moved into exact alignment with the reference point $X_{high}$. This may result in one or more of the color channels being clipped by more than the permitted clipping fraction at one end or the other or both. In step 2, the three channel histograms are shrunk simultaneously by the same amount until none of the channels exhibits more clipping than the predetermined clipping fraction. The alignment of the three control points at each end of the histogram is maintained during this process. In other words, the $X_{low}$ reference point is shifted upwards in value until no channel has more than the predetermined clipping fraction at the low end. Similarly, the $X_{high}$ reference point is shifted downward in value until no channel has more than the predetermined clipping at the high end. The old and new positions of the control points are used to establish three linear look-up tables, that is one for each of the colors, for correcting the color balance.

Third Embodiment

Following the correction according to the first or the second embodiment of the invention the color of the resulting image is well balanced. However, the true color of the scene, especially of neutral gray or white in the scene, may not correspond to the light source used to image the scene. Thus, a scene illuminated with summer skylight of color temperature 9500K would lead to a bluish white. The same scene illuminated with average summer sunlight with some skylight at a color temperature of 6500 K would give rise to a neutral white. Illumination with a flash lamp of color temperature 5000K would produce a yellowish white and an incandescent lamp of 2900K would yield a more orange white. In some cases it is advantageous to restore the appearance of the original scene illuminant even though, strictly speaking, the colors are no longer balanced. There are many ways of achieving this objective as will be obvious to those skilled in the art. One method that has been found effective and convenient is the following. A control point is chosen for performing illuminant correction expressed, for example, as a lightness $L_k$ in the CIE L*a*b* color space. While other opponent color spaces with a lightness or brightness axis may be used, color spaces such as CIE L*a*b* or CIE L*u*v* are preferred since their lightness representation is well matched to human vision. Though the exact value of this control point $L_k$ is not critical provided it is not at the extremes of the lightness range, it is preferred to have a value near the middle of the lightness range for it is here that colors tend to have the highest saturation and consequently the effect of illuminant color correction is most easily discerned. An especially preferred value of $L_k$ is that which corresponds to a mid-grey in the RGB color space, such as that represented by a neutral gray of R=G=B=127, where the range of R, G and B lies between 0 and 255. A table is prepared of the CIE L*a*b* color $a_k$, $b_k$ values for a black body radiator of this lightness ($L_k$) but of varying color temperature, k. Advantageously this table includes color temperatures from about 2000K to about 10000K. It is sufficient to have about 5 to 15 values in the table, with more values at the lower temperatures, and to achieve other values by interpolation. Several interpolation methods may be used, but linear interpolation has been found both fast and adequate. The user selects an illuminant temperature and the corresponding $a_k$, $b_k$ color components are retrieved. The shift in red, green and blue required to transform the CIE L*a*b* color with the coordinates ($L_k$, 0, 0) to that with the coordinates ($L_k$, $a_k$, $b_k$) is then computed. A gamma function correction is calculated accordingly for each channel using this adjusted control point and the lower and upper limits of the channel values. The correction function is expressed as a look-up table. The correction for illuminant is an optional one. Without this correction the image is correct for a light source of about 6500K color temperature.

Fourth Embodiment

Following correction according to one or other of the first three embodiments the image will have an appropriate color balance. However, the contrast of the image may have changed during color correction. While any contrast change may have led to a contrast improvement it is often desirable to modify only the color balance without changing contrast. This is especially desirable if the image contrast has already been independently adjusted. Accordingly, it is preferred to optionally correct the image contrast in such a way as to restore the original image contrast. This allows color to be balanced independently of other changes in the properties of the image. Many ways of accomplishing these objectives will occur to those skilled in the art. It has been found that the following procedure is both simple and gives satisfactory results. The lightness or brightness component of a suitable color space is computed for the original uncorrected image. Similarly the same lightness component is calculated for the image that results from color correction. A look-up table is constructed that maps the result image lightness histogram to the original lightness histogram, so restoring the original image contrast. While several color spaces, such as CIE L*a*b*, CIE L*u*v*, HSL, HVC or HSB, have a suitable lightness component for performing the correction, color spaces such as YIQ, YUV or YES are preferred because the transformation to and from these spaces is rapid and the Y brightness component is a good match to human perception. Of these, YIQ is especially preferred.

What is claimed is:

1. A method for correcting a color image comprising:
   averaging at least two color channels in regions near the minimum of histograms of the at least two color channels;
   selecting the smallest of the average color values as a black point;
   averaging at least two color channels in regions near the maximum of the histograms of the at least two color channels;
   selecting the largest of the average color values as a white point; and
   correcting the at least two color channels by adjusting the average color values to match the values of the black point and the white point to form corrected image data.

2. The method of claim 1 wherein the correcting further comprises imposing a clipping limit on the histogram.

3. The method of claim 2 wherein the clipping limit is imposed on each of the at least two color channels so that no more than a predetermined percentage of pixels are identified as black or white pixels.

4. The method of claim 1 wherein regions of the histogram near the minimum color values of histograms for at least two colon are selected based on the darkest non-black pixels in the histogram of the image.

5. The method of claim 1 wherein regions of the histogram near the maximum color values of histograms for at least two colors are selected based on the lightest non-white pixels in the histogram of the image.

6. The method of claim 1 wherein an original position and a final position of smallest color averages and an original position and a final position of largest color averages define two points through which a linear interpolation is used to create a look-up table for correcting color data.

7. The method of claim 6 where conceptual movement of smallest color averages in the histogram is equal to the smaller of that required to achieve alignment with a black point and that required to achieve a predetermined level of clipping and conceptual movement of largest color averages is equal to the smaller of that required to achieve alignment with a white point and that required to achieve a predetermined level of clipping.

8. The method of claim 6 wherein smallest color averages are aligned wit the black point and largest color averages are aligned with the white point and the white and black points are conceptually moved towards each other, maintaining the alignment until clipping of all colors is reduced to no more than a predetermined amount.

9. The method of claim 1 wherein the color image has an original brightness distribution and the corrected image data has an adjusted brightness distribution, and further comprising:
   replacing the adjusted brightness distribution for the corrected image data with the original brightness distribution for the color image after adjustment of colors.

10. The method of claim 3 wherein the color image has an original brightness distribution and the corrected image data has an adjusted brightness distribution, and further comprising:
    replacing the adjusted brightness distribution for the corrected image data with the original brightness distribution for the color image after adjustment of colors.

11. The method of claim 7 wherein the color image has an original brightness distribution and the corrected image data has an adjusted brightness distribution, and further comprising:
    replacing the adjusted brightness distribution for the corrected image data with the original brightness distribution for the color image after adjustment of colors.

12. The method of claim 8 wherein the color image has an original brightness distribution and the corrected image data has an adjusted brightness distribution, and further comprising:
    replacing the adjusted brightness distribution for the corrected image data with the original brightness distribution for the color image alter adjustment of colors.

13. The method of claim 9 wherein brightness is computed in a color space in which the brightness approximately matches human perception.

14. The method of claim 10 wherein brightness is computed in a color space in which the brightness approximately matches human perception.

15. The method of claim 11 wherein brightness is computed in a color space in which the brightness approximately matches human perception.

16. The method of claim 1 wherein after color adjustment, a selected illuminant color temperature correction is applied to digital image data of the color image.

17. The method of claim 3 wherein after color adjustment, a selected illuminant color temperature correction is applied to digital image data of the color image.

18. The method of claim 7 wherein after color adjustment, a selected illuminant color temperature correction is applied to digital image data of the color image.

19. The method of claim 8 wherein after color adjustment a selected illuminant color temperature correction is applied to digital image data of the color image.

20. The method of claim 9 wherein after color adjustment, a selected illuminant color temperature correction is applied to digital image data of the color image.

21. The method of claim 1 wherein at least three color channels are averaged in regions near the minimum and the maximum color values of histograms of the at least three color channels.

22. The method of claim 21 wherein averages of maximum values and averages of minimum values for all three colors are compared.

23. The method of claim 22 wherein the largest of the average maximum values of color histograms determines the amount of conceptual movement of the average maximum values for all colors towards the white point.

24. The method of claim 22 wherein the smallest of the average minimum values of color histograms determines the amount of conceptual movement of the average minimum values for all colors towards the black point.

25. The method of claim 1 wherein a separate look-up table of color temperatures in a three dimensional color space is provided, temperature corrections for images are identified, and temperature corrections are added to the corrected image data.

26. The method of claim 22 wherein a separate look-up table of color temperatures in an at least two-dimensional color space is provided, temperature corrections for images are identified, and temperature corrections are added to the corrected image data.

27. The method of claim 9 wherein brightness is computed according to a linear combination of red, green and blue data.

28. The method of claim 10 wherein brightness is computed according to a linear combination of red, green and blue data.

29. The method of claim 11 wherein brightness is computed according to a linear combination of red, green and blue data.

* * * * *